(12) United States Patent
Vietz et al.

(10) Patent No.: US 11,084,612 B2
(45) Date of Patent: Aug. 10, 2021

(54) PACKAGING OF POLYSILICON FRAGMENTS

(71) Applicant: Wacker Chemie AG, Munich (DE)

(72) Inventors: Matthias Vietz, Mattighofen (AT); Werner Lazarus, Mitterskirchen (DE)

(73) Assignee: WACKER CHEMIE AG, Munich (DE)

( * ) Notice: Subject to any disclaimer, the term of this patent is extended or adjusted under 35 U.S.C. 154(b) by 864 days.

(21) Appl. No.: 14/771,421

(22) PCT Filed: Feb. 13, 2014

(86) PCT No.: PCT/EP2014/052826
§ 371 (c)(1),
(2) Date: Aug. 28, 2015

(87) PCT Pub. No.: WO2014/131625
PCT Pub. Date: Sep. 4, 2014

(65) Prior Publication Data
US 2016/0001904 A1 Jan. 7, 2016

(30) Foreign Application Priority Data
Feb. 28, 2013 (DE) ...................... 10 2013 203 336.2

(51) Int. Cl.
| | |
|---|---|
| *B65B 37/18* | (2006.01) |
| *B65B 1/32* | (2006.01) |
| *B65B 1/36* | (2006.01) |
| *G01G 19/387* | (2006.01) |
| *B65B 25/00* | (2006.01) |
| *B65B 7/02* | (2006.01) |
| *B65B 51/22* | (2006.01) |

(52) U.S. Cl.
CPC ............... *B65B 37/18* (2013.01); *B65B 1/32* (2013.01); *B65B 1/36* (2013.01); *B65B 7/02* (2013.01); *B65B 25/00* (2013.01); *B65B 51/22* (2013.01); *G01G 19/387* (2013.01)

(58) Field of Classification Search
CPC .... B65B 1/04; B65B 1/32; B65B 1/36; B65B 37/18; B65B 7/02; B65B 25/00; B65B 51/22; B65D 77/061; B65D 77/062; B65D 77/06
USPC .......................................... 53/469, 502, 449
See application file for complete search history.

(56) References Cited

U.S. PATENT DOCUMENTS

| | | | |
|---|---|---|---|
| 4,813,205 A | | 3/1989 | Mikata et al. |
| 5,363,867 A | * | 11/1994 | Kawano ................. B08B 9/093 134/95.2 |
| 6,127,635 A | * | 10/2000 | Zeyer .................. G01G 19/393 177/103 |
| 6,265,683 B1 | | 7/2001 | Flottmann et al. |
| 6,375,011 B1 | * | 4/2002 | Flottmann ............... B07B 1/469 198/750.1 |
| 2005/0034430 A1 | * | 2/2005 | Holzlwimmer .......... B65B 1/28 53/469 |
| 2006/0088970 A1 | | 4/2006 | Hesse et al. |
| 2010/0154357 A1 | * | 6/2010 | Wochner ................. B65B 39/12 53/405 |
| 2012/0052297 A1 | | 3/2012 | Pech et al. |
| 2012/0198793 A1 | | 8/2012 | Vietz et al. |
| 2013/0042582 A1 | | 2/2013 | Vietz et al. |
| 2013/0309524 A1 | * | 11/2013 | Vietz ..................... B65D 31/00 428/641 |

FOREIGN PATENT DOCUMENTS

| | | |
|---|---|---|
| DE | 3640520 A1 | 6/1988 |
| EP | 1645333 A1 | 4/2006 |

* cited by examiner

*Primary Examiner* — Chelsea E Stinson
*Assistant Examiner* — Mary C Hibbert-Copeland
(74) *Attorney, Agent, or Firm* — Brooks Kushman P.C.

(57) ABSTRACT

Accurate and repeatable portioning of polycrystalline silicon chunks without excessive generation of fines is accomplished by separating silicon chunks into a multiplicity of weighed portions and combining at least four portions which together closely match a target weight into a plastic shipment bag which is then closed.

12 Claims, No Drawings

PACKAGING OF POLYSILICON FRAGMENTS

CROSS REFERENCE TO RELATED APPLICATIONS

This application is the U.S. National Phase of PCT Appln. No. PCT/EP2014/052826 filed Feb. 13, 2014, which claims priority to German Application No. 10 2013 203 336.2 filed Feb. 28, 2013, the disclosures of which are incorporated in their entirety by reference herein.

BACKGROUND OF THE INVENTION

1. Field of the Invention

The invention relates to a method for packing polysilicon chunks.

2. Description of the Related Art

Chunk polysilicon is, for example, deposited from trichlorosilane by means of the Siemens process and then comminuted, ideally without contamination. A process for automatic crushing and a corresponding apparatus described in EP 1 645 333 A1.

For applications in the semiconductor and solar industries, chunk polysilicon with a minimum contamination level is desirable. Therefore, the material should also be packed with low contamination before it is transported to the customer.

Typically, chunk polysilicon for the electronics industry is packed in 5 kg bags with a weight tolerance of +/−max. 50 g. For the solar industry, chunk polysilicon in bags containing a weight of 10 kg with a weight tolerance of +/−max. 100 g are customary.

Tubular bag machines suitable in principle for packing chunk silicon are commercially available. A corresponding packing machine is described, for example, in DE 36 40 520 A1.

Chunk polysilicon is a sharp-edged, non-free-flowing bulk material having a weight of the individual Si chunks of up to 2500 g. Therefore, in the course of packing, it has to be ensured that the material does not penetrate the customary plastic bags in the course of filling, or in the worst case even completely destroy them. In order to prevent this, the commercial packing machines have to be suitably modified for the purpose of packing polysilicon.

With commercial packing machines, it is generally impossible to comply with the purity demands which are made on chunk polysilicon, since the composite films typically used, because of the chemical additives, can lead to increased contamination of the chunk polysilicon.

US 20050034430 A1 discloses an apparatus for cost-effective, fully automatic transporting, weighing, portioning, filling and packaging high purity polysilicon fragments, comprising a conveyor channel for the polysilicon fragments, a weighing device for the polysilicon fragments, which is connected to a hopper, deflection plates made from silicon, a filling device which forms a plastic bag from a highly pure plastic film, comprising a deionizer which prevents electrostatic charging and therefore contamination of the plastic film with particles, a welding device for the plastic bag filled with polysilicon fragments, a flowbox which is fitted above the conveyor channel, weighing device, filling device and welding device and which prevents contamination of the polysilicon fragments by particles, a conveyor belt having a magnetically inductive detector for the welded plastic bag filled with polysilicon fragments, all the components which come into contact with the polysilicon fragments being sheathed with silicon or clad with a highly wear-resistant plastic.

Means for portioning the chunk polysilicon are, for example, a time-controlled conveyor channel or a fill height determination in a reservoir vessel or a weighing device for the chunk polysilicon. A corresponding weighing device is known, for example, from U.S. Pat. No. 4,813,205 A.

The apparatus according to US 20050034430 A1 is supposed to enable low-contamination packing without human contact. The low-contamination packing is supposed to be accomplished particularly through the sheathing of the components with silicon or with a highly wear-resistant plastic.

However, it has been found that specifically the portioning of the chunk silicon in a procedure according to US 20050034430 A1 is problematic. Exact weighing of 10 kg of chunk polysilicon with a tolerance of +/−100 g is not possible by means of this apparatus.

Moreover, the whole arrangement was found to have low mechanical stability as a result of the silicon or plastic sheathing of all the parts which come into contact with silicon. The relatively high wear on the silicon and plastic coatings makes the packing machines extremely maintenance-intensive.

US 20100154357 A1 discloses a device for packaging crushed polycrystalline silicon material or polysilicon granules, comprising a carousel filling and closing machine, or a device with a non-circular arrangement, with a filling station and a closing station, in which a PE bag is suspended on a gripper system and moved from station to station in a cyclical sequence, characterized in that the filling station comprises a freely suspended energy absorber of a nonmetallic low-contamination material, which is introduced into the PE bag before the filling of the PE bag with polycrystalline silicon and is removed from the PE bag after the filling of the PE bag with polycrystalline silicon, and the filled PE bag is transported further by means of the gripper system into the closing station and is closed there.

US 20100154357 A1 also describes a method for packaging polycrystalline silicon, in which polycrystalline silicon is filled by means of a filling device into a freely suspended, completely formed bag, and the filled bag is subsequently closed, characterized in that the bag consists of high-purity plastic with a wall thickness of from 10 to 1000 µm. Preferably, the closed plastic bag filled with polycrystalline silicon is introduced into a further plastic bag of PE with a wall thickness of from 10 to 1000 µm, and this second plastic bag is closed.

According to US 20100154357 A1, the polysilicon is first portioned and weighed before the packaging. This portioning and weighing of the chunk polysilicon is effected by means of a manual or automatic method known from the prior art. With regard to automatic portioning, the apparatus known from US 20050034430 A1 is mentioned, but this has the disadvantages described above.

According to US 20100154357 A1, the welding of the PE bag is effected with a heat-sealing device, in which the metallic welding wire is sheathed with a nonmetallic material, for example polytetrafluoroethylene (PTFE).

US 20120198793 A1 discloses a method for dosing and packaging polysilicon chunks, wherein a product flow of polysilicon chunks is transported via a feed channel, separated by means of at least one screen into coarse and fine chunks, weighed and dosed to a target weight by means of a dosing balance, discharged via a discharge channel and transported to a packaging unit where a first plastic bag is filled with the polysilicon chunks and sealed, wherein this plastic bag containing polysilicon chunks is packaged by means of a further plastic bag which is formed by a shaper and is subsequently welded, wherein the at least one screen and the dosing balance at least partially comprise a hard metal on their surfaces and the shaper for forming the plastic bag comprises a wear-resistant coating.

The prior art often envisages manual weight correction or even manual packing of polysilicon in order to be able to comply with the weight tolerances required.

Moreover, there exists the problem that transport and weighing of the polysilicon chunks in conveyor channels, screens, metering systems and discharge channels gives rise to fines. These fines have to be screened off again and classified. In a system comprising screens which separate the product stream into coarse and fine fractions, fines formation is particularly marked because of the necessary fall heights.

The prior art also discloses multihead weighers. Multihead weighers or combination weighers are used particularly in the food and drink industry for filling containers provided (e.g. bags, boxes, cups, cans or jars).

In the case of a circular multihead weigher, the product is supplied centrally above the weighing system (for example on a distributor plate). The product is conveyed thereon in a radially outward direction to the reservoir vessel arranged in a circle (called preliminary pans) and then into the weighing vessels beneath (called weighing pans). From several portions, a computer determines the combination that comes closest to the target weight and triggers the simultaneous emptying. The emptied reservoir and weighing vessels are then filled again immediately.

A multihead weigher of this kind is described, for example, in U.S. Pat. No. 6,127,635 A, namely a combinational weighing device comprising a plurality of load cells with corresponding associated weighing hoppers each having a closable outlet, an outlet-side transfer device for supplying weighed products into packages to be arranged therebelow, and a controller having an input connected to the output sides of the load cells and an output connected to respective drives for operating the closable outlets of the weighing hoppers, the controller controlling the outlets of the weighing hoppers such that a respective subcombination of several weighing hoppers is selected to form a total amount to be supplied to a package, characterized in that the controller is switchable to a second operational mode wherein it drives the outlets of the weighing hoppers such that each weighing hopper is selected independently of the other weighing hoppers.

A multihead weigher of this kind would be unsuitable for metering and subsequent packaging of polysilicon chunks in plastic bags, since the necessary fall heights would lead to formation of fines here too. Moreover, the polysilicon would be contaminated through metering and weighing of this kind, and the necessity of screening off fines.

SUMMARY OF THE INVENTION

These problems of the prior art gave rise to the objective of the invention. These and other objects are solved by a method for packing polysilicon chunks, comprising providing an amount of polysilicon chunks, taking a multitude of portions from the amount of polysilicon chunks and weighing the portions, optionally classifying the portions of polysilicon chunks by size classes, defining a target weight for the silicon chunks to be packed in a plastic bag, combining at least 4 portions from the multitude of portions of polysilicon chunks which have a total weight closest to the target weight, introducing the polysilicon chunks of the at least 4 portions into a plastic bag, and welding the plastic bag.

DETAILED DESCRIPTION OF THE PREFERRED EMBODIMENTS

This problem is solved by a method for packing polysilicon chunks, comprising providing an amount of polysilicon chunks, taking a multitude of portions from the amount of polysilicon chunks and weighing the portions, optionally classifying the portions of polysilicon chunks by size classes, defining a target weight for the silicon chunks to be packed in a plastic bag, combining the at least 4 portions from the multitude of portions of polysilicon chunks which have a total weight closest to the target weight, introducing the polysilicon chunks of the at least 4 portions into a plastic bag and welding the plastic bag.

The amount of polysilicon chunks is preferably provided by means of polysilicon chunks moved on a conveyor channel. The size distribution of the polysilicon chunks in the starting material stream depends upon factors including the preceding comminution processes. The manner of division into coarse and fine chunks and the size of the coarse and fine chunks depend on the desired end product which is to be metered and packed.

The portions of the polysilicon chunks may be a multitude of polysilicon chunks, but also individual chunks. The individual chunks are preferably chunks having a minimum weight of 500 g.

The overall method of taking portions, weighing the portions, and combining the portions for metering to a target weight can run either manually or in automated form.

It has been found that this method is particularly gentle on the product. The combination of at least 4 weighed portions can achieve a particularly exact metering outcome.

It is thus envisaged that portions or individual chunks will be weighed and optionally classified. In the event of classification, more particularly, the portion is assigned to a particular size class.

The size class is defined as the longest distance between two points on the surface of a silicon chunk (=max. length):
Chunk size 0 [mm] 1 to 5
Chunk size 1 [mm] 4 to 15
Chunk size 2 [mm] 10 to 40

As well as the aforementioned size classes, the classification and sorting of polycrystalline silicon into the following chunk sizes is likewise customary:
Chunk size 3 [mm] 20 to 60
Chunk size 4 [mm] 45 to 120
Chunk size 5 [mm] 90 to 200

In these cases, at least 90% by weight of each of the chunk fractions is within the size ranges mentioned.

A multitude of portions can be taken from the amount of polysilicon chunks by means of shovels, grabs, vessels, or manually. When they are taken manually, preference is given to the use of suitable low-contamination gloves, for example an outer glove in combination with an inner glove, in which case the palm region area of the outer glove consists of LDPE and the backside region area of the outer glove consists of Tyvek® (DuPont), the two areas being welded to one another, and the inner glove consisting of Dyneema® (Royal DSM N.V.) coated with polyurethane.

Tyvek® from DuPont is a fibrous functional textile resembling a sheet of paper and composed of thermally welded fibers of high-density polyethylene (HDPE).

Dyneema® from Royal DSM N.V. is a high-strength polyethylene fiber (PE) having a tensile strength of 3 to 4 GPa (3000 to 4000 N/mm$^2$).

It is likewise possible to use a multilayer glove, in which case the outer layer of the glove consists of a palm region area composed of LDPE and a backside region area composed of Tyvek®, the two areas being welded to one another, and at least one of the inner layers of the glove consists of Dyneema® coated with polyurethane.

The portions can be weighed volumetrically. Especially in the case of small chunk sizes, the bulk density of the polysilicon is known, and so, with the volume, the weight of the portions is also known or can be determined. The volume of the portion is known when vessels, shovels or the like with defined fill volume are used. This also applies to the manual taking of portions. If appropriate, an estimate can also be made.

However, the method can also be automated. The portions can be weighed gravimetrically, for example by means of continuous weighing systems, or optically by means of camera systems with upstream metering channels for portioning. The material division is preferably effected by means of a regulation system which is controlled by means of volumetric or gravimetric input parameters. With this regulation system, it is possible to constantly feed a product conveying stream and to divide it into a multitude of portions.

If a continuous conveying stream is involved, which is preferred, the conveying stream is controlled by the result from the weighing or classifying unit.

Thereafter, the portions are preferably conducted into a buffer store in order to be combined at a later stage to give the desired packing amount. Such a buffer store comprises a multitude of buffer vessels each containing a portion of polysilicon chunks.

This amount of polysilicon chunks, combined from the at least 4 portions, is subsequently packed into at least one plastic bag.

Preference is given to packing into two plastic bags, inner bag and an outer bag, in which case the polysilicon chunks of the at least 4 portions are first filled into a first plastic bag, which is then closed, and the first plastic bag containing polysilicon chunks is subsequently introduced into a second plastic bag and the latter is likewise closed.

It is likewise preferable to fill the polysilicon chunks of the at least 4 portions into a first plastic bag, which is inserted into a second plastic bag, and subsequently to close the two plastic bags. In this execution, one bag has already been inserted into the other before the polysilicon is introduced.

If necessary, the polysilicon chunks are cleaned by wet-chemical means before packing.

For dispensing, the device described in US 20100154357 A1 is suitable, comprising a freely suspended energy absorber which is introduced into the inner plastic bag before filling with the polycrystalline silicon. The polycrystalline silicon is filled into the plastic bag by way of the energy absorber. The freely suspended energy absorber is subsequently removed from the plastic bag filled with polycrystalline silicon, and the plastic bag is closed.

The plastic bag can be closed, for example, by means of welding, bonding or form-fitting. It is preferably closed by means of welding.

The bag ideally consists of a plastic film having a thickness of 100-500 μm.

The plastic used is preferably a monofilm composed of PE-LD, PE-LLD or PE-HD. The use of multilayer films from blown film extrusion or casting processes is likewise possible.

In the case of conventional metering, 1%-3% of the total amount of fine material has to be screened out again before the packing.

In the method according to the invention, less than 0.5% of the total amount occurs in the form of fine material. Thus, much less fine material arises, which may have to be classified again.

The fine material of polycrystalline silicon, in the context of the invention, for chunk sizes 3 to 5, comprises particles which can be sieved off by means of a mesh screen having a mesh size of 8 mm (square meshes) from the total amount of chunks combined from at least 4 portions. The fines fraction is quantified gravimetrically.

In the case of chunk size 2, the fine material comprises particles of polycrystalline silicon having a size of less than 8.3 mm, preferably having a size of less than 9.5 mm.

In the case of chunk size 1, the fine material comprises particles of polycrystalline silicon having a size of less than 3.5 mm, preferably having a size of less than 3.9 mm.

In the case of chunk size 0, the fine material comprises particles of polycrystalline silicon having a size of less than 1 mm.

The fines fraction of chunk sizes 0 to 2 is determined by means of a commercial particle size measuring instrument, for example a Camsizer® from Retsch. The measurement employed for the fines fraction was the 1% by weight quantile (=10000 ppmw).

When metering greater chunk sizes having a piece weight from 500 g, a target weight of 10 kg (+−100 g) can only be attained through the combination of portions.

In the case of a manual hand-packing process, the buffer vessels of the buffer store are marked visually in order to enable the combination of the portions to give the target weight.

Through the combination of portions, it is also possible to establish a more economically viable process, especially since further work (for example because of under-/over-weight outside the tolerance) is dispensed with. Process scatter is much smaller than with conventional net or gross balances.

The invention claimed is:

1. A method for packaging polysilicon chunks portioned from a supply of polysilicon chunks, comprising:
   a) defining a target weight and a target weight tolerance for polysilicon chunks to be contained in a plastic bag;
   b) removing a multiplicity of portions of polysilicon chunks having chunk sizes in the range of 20 to 200 mm from the supply of polysilicon chunks each of the portions having a weight less than the target weight;
   c) weighing each portion of the multiplicity of portions of polysilicon chunks, and storing each weighed portion in a buffer vessel of a buffer store comprising a multitude of buffer vessels, each buffer vessel containing a single weighed individual portion;
   d) selecting four or more buffer vessels from the multiplicity of buffer vessels of the buffer store, which together contain a total weight of polysilicon chunks within said target weight tolerance of the target weight;
   e) combining the polysilicon chunks from the buffer vessels selected in step (d);
   f) introducing the combined polysilicon chunks from step e) into the plastic bag and closing the bag;

wherein the steps b), c), e) and f), are conducted manually, and wherein during steps b)-f) less than 0.5 wt. % of fine material consisting of particles having a size which could be sieved off by a mesh screen having a mesh size of 8 mm (square meshes) forms from the portions of polysilicon chunks.

2. The process of claim 1, wherein each buffer vessel contains a plurality of polysilicon chunks or a single polysilicon chunk.

3. The process of claim 1, where at least one buffer vessel contains a single polysilicon chunk having a size of 500 g to 2500 g.

4. The process of claim 1, wherein the target weight tolerance of polysilicon chunks in the closed bag produced in step f) is within 1 weight percent of the target weight.

5. The process of claim 1, wherein the supply of polysilicon chunks has been previously classified.

6. The process of claim 1, wherein prior to step b), fine material which could be sieved off by a mesh screen having a mesh size of 8 mm (square meshes) has been removed.

7. A method for packaging polysilicon chunks portioned from a supply of polysilicon chunks, comprising:
 a) defining a target weight and a target weight tolerance for polysilicon chunks to be contained in a plastic bag;
 b) removing a multiplicity of portions of polysilicon chunks having chunk sizes in the range of 20 to 200 mm from the supply of polysilicon chunks, each of the portions having a weight less than the target weight:
 c) weighing each portion of the multiplicity of portions of polysilicon chunks, and introducing each weighed portion into a single buffer vessel of a buffer store comprising a multitude of buffer vessels, each buffer vessel containing a single weighed portion:
 d) selecting four or more buffer vessels from the multiplicity of buffer vessels of the buffer store, which together contain a total weight of polysilicon chunks within said target tolerance of the target weight;
 e) combining the polysilicon chunks from the buffer vessels selected in step d) by introducing the contents of each selected buffer vessel into the plastic bag, and closing the bag;
wherein the steps b), c), and e), are conducted manually, and wherein during steps b)-e) less than 0.5 wt. % of fine material consisting of particles having a size which could be sieved off by a mesh screen having a mesh size of 8 mm (square meshes) forms from the portions of polysilicon chunks.

8. The process of claim 7, wherein each buffer vessel contains a plurality of polysilicon chunks or a single polysilicon chunk.

9. The process of claim 7, where at least one buffer vessel contains a single polysilicon chunk having a size of 500 g to 2500 g.

10. The process of claim 7, wherein the target weight tolerance of polysilicon chunks in the closed bag produced in step f) is within 1 weight percent of the target weight.

11. The process of claim 7, wherein the supply of polysilicon chunks has been previously classified.

12. The process of claim 7, wherein prior to step b), fine material which could be sieved off by a mesh screen having a mesh size of 8 mm (square meshes) has been removed.

* * * * *